United States Patent
Ying et al.

(10) Patent No.: US 10,283,061 B2
(45) Date of Patent: May 7, 2019

(54) PIXEL STRUCTURE, ARRAY SUBSTRATE, AND DISPLAY PANEL

(71) Applicant: Shenzhen China Star Optoelectronics Technology Co., Ltd., Shenzhen, Guangdong (CN)

(72) Inventors: Jianjian Ying, Guangdong (CN); Peng Du, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 82 days.

(21) Appl. No.: 15/329,368

(22) PCT Filed: Jan. 16, 2017

(86) PCT No.: PCT/CN2017/071283
§ 371 (c)(1),
(2) Date: Sep. 29, 2017

(87) PCT Pub. No.: WO2018/120324
PCT Pub. Date: Jul. 5, 2018

(65) Prior Publication Data
US 2018/0342214 A1 Nov. 29, 2018

(30) Foreign Application Priority Data

Dec. 30, 2016 (CN) .......................... 2016 1 1257495

(51) Int. Cl.
*G09G 5/10* (2006.01)
*G09G 3/36* (2006.01)
(Continued)

(52) U.S. Cl.
CPC ......... *G09G 3/3607* (2013.01); *G02F 1/1362* (2013.01); *G02F 1/1368* (2013.01);
(Continued)

(58) Field of Classification Search
CPC .. G09G 3/3648; G09G 3/3607; G09G 3/3696; G09G 3/36; G09G 2300/0809;
(Continued)

(56) References Cited

U.S. PATENT DOCUMENTS 9,268,184 B2 * 2/2016 Xu ..................... G02F 1/136213
9,588,381 B2 * 3/2017 Shin .................. G02F 1/134309
(Continued)

FOREIGN PATENT DOCUMENTS

CN       103744208 A    4/2014
CN       104678663 A    6/2015
(Continued)

OTHER PUBLICATIONS

International Search Report and Written Opinion for International Application No. PCT/CN2017/071283, dated Sep. 30, 2017.
(Continued)

*Primary Examiner* — Vijay Shankar

(57) ABSTRACT

Disclosed are a pixel structure, an array substrate, and a display panel. In the pixel structure, a stabilizing line is configured to provide a stabilized signal to each pixel unit in a corresponding pixel unit group. When a high grayscale image is displayed, the stabilized signal provided by the stabilizing line is the same as a data signal received by a pixel unit in a turned-on state in the corresponding pixel unit group. Light transmittance and picture contrast of the display panel can be improved when the high grayscale image is displayed.

20 Claims, 7 Drawing Sheets

(51) Int. Cl.
*G02F 1/1362* (2006.01)
*G02F 1/1368* (2006.01)
*G02F 1/1335* (2006.01)

(52) U.S. Cl.
CPC .. *G02F 1/133514* (2013.01); *G02F 1/136286* (2013.01); *G09G 3/3648* (2013.01); *G09G 3/3655* (2013.01); *G02F 2203/30* (2013.01); *G09G 3/3696* (2013.01); *G09G 2300/0426* (2013.01); *G09G 2300/0447* (2013.01); *G09G 2300/0809* (2013.01); *G09G 2320/028* (2013.01); *G09G 2320/0233* (2013.01); *G09G 2320/066* (2013.01); *G09G 2320/0673* (2013.01)

(58) Field of Classification Search
CPC ....... G09G 2320/066; G09G 2320/028; G09G 2320/0233; G09G 2320/0673
See application file for complete search history.

(56) References Cited

U.S. PATENT DOCUMENTS 9,633,619 B2 * 4/2017 Xu .......................... G02F 1/133
9,958,739 B2 * 5/2018 Shin .................. G02F 1/134309
2016/0306246 A1 10/2016 Kum et al.

FOREIGN PATENT DOCUMENTS

| CN | 104698643 A | 6/2015 |
| CN | 105445966 A | 3/2016 |

OTHER PUBLICATIONS

Chinese Office Action and Search Report for Chinese Patent Application No. 201611257495.1 dated Jun. 25, 2018.

* cited by examiner

PIXEL STRUCTURE, ARRAY SUBSTRATE, AND DISPLAY PANEL

CROSS-REFERENCE TO RELATED APPLICATIONS

This application claims the priority of Chinese patent application CN201611257495.1, entitled "Pixel structure, array substrate, and display panel" and filed on Dec. 30, 2016, the entirety of which is incorporated herein by reference.

FIELD OF THE INVENTION

The present disclosure relates to the technical field of liquid crystal display, and in particular, to a pixel structure, an array substrate comprising the pixel structure, and a display panel comprising the array substrate.

BACKGROUND OF THE INVENTION

With the development of liquid crystal display technology, resolution of liquid crystal display device becomes higher and higher, and image becomes more and more clear, while pixel size becomes smaller and smaller. In order to ensure image quality of a display device, pixel design should meet higher requirements. In the prior art, a low color shift technology is commonly used to increase a viewing angle of a display device, so as to realize a wide viewing angle of the display device. In the prior art, the low color shift technology is usually realized by a 3T (3 TFTs) structure since panel problems such as afterimages are less likely to appear thereon.

FIG. 1 schematically shows a 3T structure in the prior art. As shown in FIG. 1, the 3T structure comprises three TFTs arranged in one same pixel unit. The pixel unit comprises a main pixel unit 1 provided with a first TFT, and a sub-pixel unit 2 provided with a second TFT and a third TFT (i.e., a sharing TFT). A pixel electrode of the sub-pixel unit 2 discharges to a stabilized electric potential (i.e., an Acom electric potential) through the third TFT so as to reach an electric potential different from that of a pixel electrode of the main pixel unit 1. Therefore, the main pixel unit 1 and the sub-pixel unit 2 have different pixel voltages. The viewing angle can be increased by adjusting a Gamma curve. In the aforesaid 3T structure, all stabilizing lines for providing the stabilized electric potentials are connected together. Whether a high grayscale image of 255 or a medium-low grayscale image is displayed, stabilized signals provided by each of the stabilizing lines owe the same.

However, in the case that the high grayscale image is displayed, the large viewing angle of the display panel does not need to be adjusted. When the aforesaid 3T structure is used to display the medium-low grayscale image and the high grayscale image, same stabilized signals are provided to all the stabilizing lines. As a result, an electric potential difference always exists between the main pixel unit 1 and the sub-pixel unit 2. Therefore, the aforesaid 3T structure leads to decrease of light transmittance and picture contrast of a display panel when the high grayscale image is displayed.

SUMMARY OF THE INVENTION

The technical problem to be solved by the present disclosure lies in that: in the prior art, since stabilizing lines of a 3T structure are connected to one another, same stabilized signals are provided to all the stabilizing lines when a medium-low gray scale image and a high grayscale image are displayed. As a result, an electric potential difference always exists between a main pixel unit and a sub-pixel unit, and light transmittance and picture contrast of a display panel are decreased.

In order to solve the aforesaid technical problem, the present disclosure provides a pixel structure, an array substrate, and a display panel.

According to a first aspect of the present disclosure, the present disclosure provides a pixel structure, which comprises a plurality of pixel unit groups. Each pixel unit group comprises a plurality of pixel units arranged in sequence along a data line direction, wherein each pixel unit comprises:

a main pixel unit, configured to receive a scanning signal from a scanning line, and receive a data signal from a data line so as to have a main pixel voltage;

a sub-pixel unit, configured to receive the scanning signal from the scanning line, and receive the data signal from the data line and a stabilized signal from a stabilizing line so as to have a sub-pixel voltage;

wherein stabilizing lines correspond to the pixel unit groups one to one, and each stabilizing line is configured to provide the stabilized signal to each pixel unit in a corresponding pixel unit group; and wherein the stabilized signal provided by the stabilizing line is the same as a data signal received by a pixel unit in a turned-on state in the corresponding pixel unit group when a high grayscale image is displayed.

Preferably, the stabilized signal provided by the stabilizing line differs from the data signal received by the pixel unit in the turned-on state in the corresponding pixel unit group when a medium-low grayscale image is displayed.

Preferably, the stabilized signal provided by the stabilizing line is a direct-current (DC) signal when the medium-low grayscale image is displayed.

Preferably, the stabilizing line is arranged in a same layer as a drain of a switching element of a sub-pixel unit in each pixel unit in a corresponding pixel unit group.

Preferably, the switching element is a thin film transistor.

Preferably, the pixel structure is driven by a column inversion driving mode.

Preferably, the pixel structure is driven by a dot inversion driving mode.

Preferably, the pixel structure is driven by a flip pixel driving mode.

According to a second aspect of the present disclosure, the present disclosure provides an array substrate, which comprises:

a plurality of scanning lines and a plurality of data lines which are arranged crisscross; and the aforesaid pixel structure.

According to a third aspect of the present disclosure, the present disclosure provides a display panel, which comprises:

the aforesaid array substrate, a color filter substrate, and a liquid crystal layer arranged between the array substrate and the color filter substrate.

Compared with the prior art, one embodiment or more embodiments in the aforesaid technical solutions can have the following advantages or beneficial effects.

By applying the pixel structure of the present embodiments, brightness of grayscale of a display panel can be improved when a high grayscale image is displayed, so that light transmittance and picture contrast of the display panel can be improved. In addition, a large viewing angle compensation function of the display panel can be achieved when the medium-low grayscale image is displayed.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure, and constitute one part of the description. The drawings are used for interpreting the present disclosure together with the embodiments, not for limiting the present disclosure. In the drawings.

DETAILED DESCRIPTION OF THE EMBODIMENTS

Figure 1:
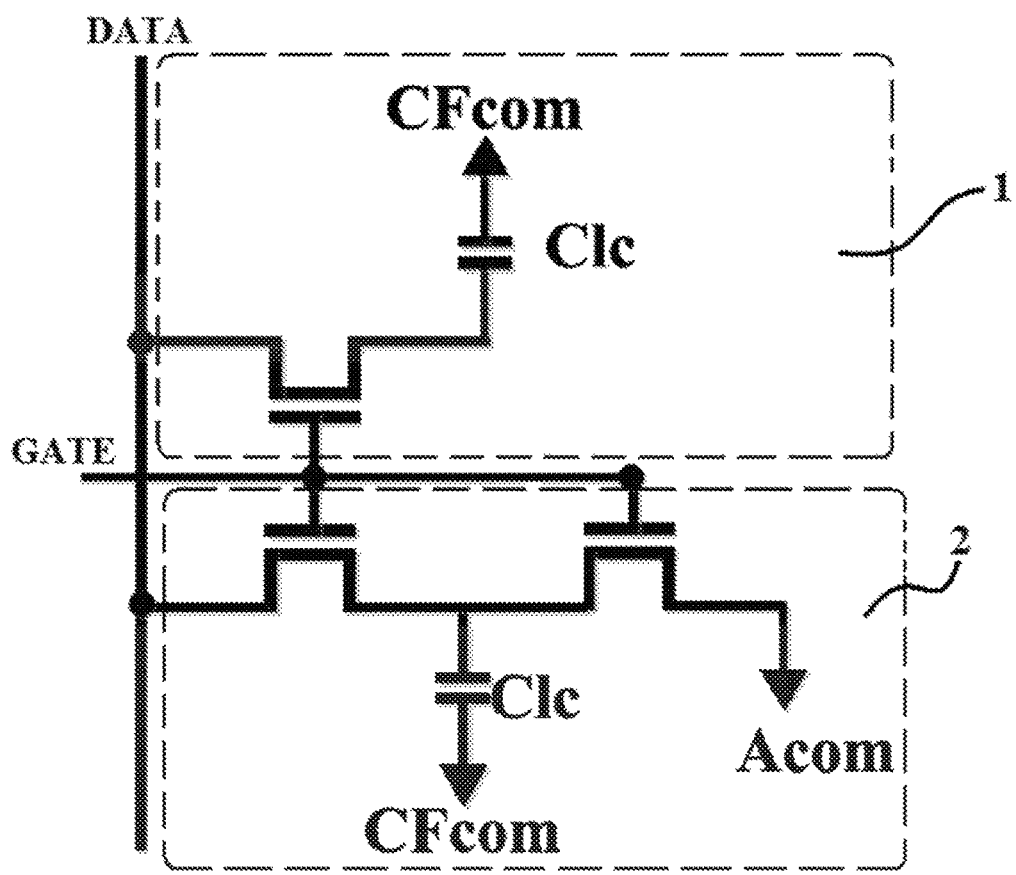
FIG. 1 schematically shows a 3T structure in the prior art.

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

In the prior art, when a traditional 3T structure is used to display a medium-low grayscale image and a high grayscale image, same stabilized signals are provided to all stabilizing lines. As a result, an electric potential difference always exists between a main pixel unit and a sub-pixel unit. It can be seen that, the traditional 3T structure leads to decrease of light transmittance and picture contrast of a display panel when the high grayscale image is displayed.

In order to solve the aforesaid technical problem in the prior art, the embodiments of the present disclosure provide a pixel structure.

Embodiment 1

According to the present embodiment, the pixel structure comprises a plurality of pixel unit groups. Each pixel unit group comprises a plurality of pixel units arranged in sequence along a data line direction. According to the present embodiment, scanning lines are arranged along a horizontal direction, while data lines are arranged along a vertical direction. Each pixel unit comprises a main pixel unit 1 and a sub-pixel unit 2. The main pixel unit 1 and the sub-pixel 2 belonging to one same pixel unit are controlled by one same scanning line and one same data line.

Specifically, in one pixel unit, the main pixel unit 1 is configured to receive a scanning signal from a scanning line, and receive a data signal from a data line so as to have a main pixel voltage. The sub-pixel unit 2 is configured to receive the scanning signal from the same scanning line as the main pixel unit 1, and receive the data signal from the same data line as the main pixel unit 1 and a stabilized signal from a stabilizing line so as to have a sub-pixel voltage.

Stabilizing lines correspond to the pixel unit groups one to one. That is, each pixel unit group uniquely corresponds to one stabilizing line. The stabilizing line is configured to provide a stabilized signal to each pixel unit in a corresponding pixel unit group.

When a high grayscale image is displayed, the stabilized signal provided by the stabilizing line is the same as a data signal received by a pixel unit in a turned-on state in the corresponding pixel unit group. However, when a medium-low grayscale image is displayed, the stabilized signal provided by the stabilizing line differs from the data signal received by the pixel unit in the turned-on state in the corresponding pixel unit group. Here, the high grayscale image refers to an image with a grayscale value of 255. The medium-low grayscale image refers to an image with a grayscale value satisfying [0,255), i.e., the image with the grayscale value larger than or equal to 0, and smaller than 255.

According to the present embodiment, when the high grayscale image is displayed, for each pixel unit of the pixel structure, since the stabilized signal is the same as the data signal, the stabilized signal will not pull down the sub-pixel voltage. In this case, the main pixel voltage equals to the sub-pixel voltage. It can be seen that, in the case that the high grayscale image is displayed, and the pixel structure according to the present embodiment is applied, brightness of a display panel can be improved, and thus light transmittance and picture contrast of the display panel can be improved.

According to the present embodiment, when the medium-low grayscale image is displayed, for each pixel unit of the pixel structure, since the stabilized signal differs from the data signal, the stabilized signal will pull down the sub-pixel voltage. In this case, the main pixel voltage differs from the sub-pixel voltage. It can be seen that, in the case that the medium-low grayscale image is displayed, and the pixel structure according to the present embodiment is applied, a large viewing angle compensation function of the display panel can be achieved.

Embodiment 2

According to the present embodiment, stabilizing lines are optimized based on the first embodiment.

According to the present embodiment, when a medium-low grayscale image is displayed, a stabilized signal provided by a stabilizing line is a direct-current (DC) signal. Besides, a switching element according to the present embodiment is a thin film transistor.

According to the present embodiment, the stabilizing line is arranged in a same layer as a drain of the switching element of a sub-pixel unit 2 in each pixel unit in a corresponding pixel unit group. In this manner, the stabilizing line can be directly connected to the drain of the switching element arranged in the same layer instead of connected to the drain through a via hole.

According to the present embodiment, the stabilizing line and the drain of the switching element can be simultaneously formed by one patterning procedure. In this manner, manufacturing steps and difficulty can be reduced, and manufacturing efficiency and product performance of a display device can be improved.

According to the following three embodiments, the pixel structure according to the first embodiment or the second embodiment is driven by a column inversion driving mode, a dot inversion driving mode, and a flip pixel driving mode in sequence. In addition, when a high grayscale image is displayed, a positive data signal provided by a data line is set to 14.2V, and a negative data signal provided by the data line is set to −0.2V. It should be noted that, actual data signals can be adjusted according to the condition of the panel, which is not repeated here.

Embodiment 3

According to the present embodiment, the pixel structure is driven by a column inversion driving mode. In the column inversion driving mode, polarities of data signals corresponding to two adjacent columns of pixels are opposite, as shown in positive and negative signs in FIG. 2.

Figure 2:
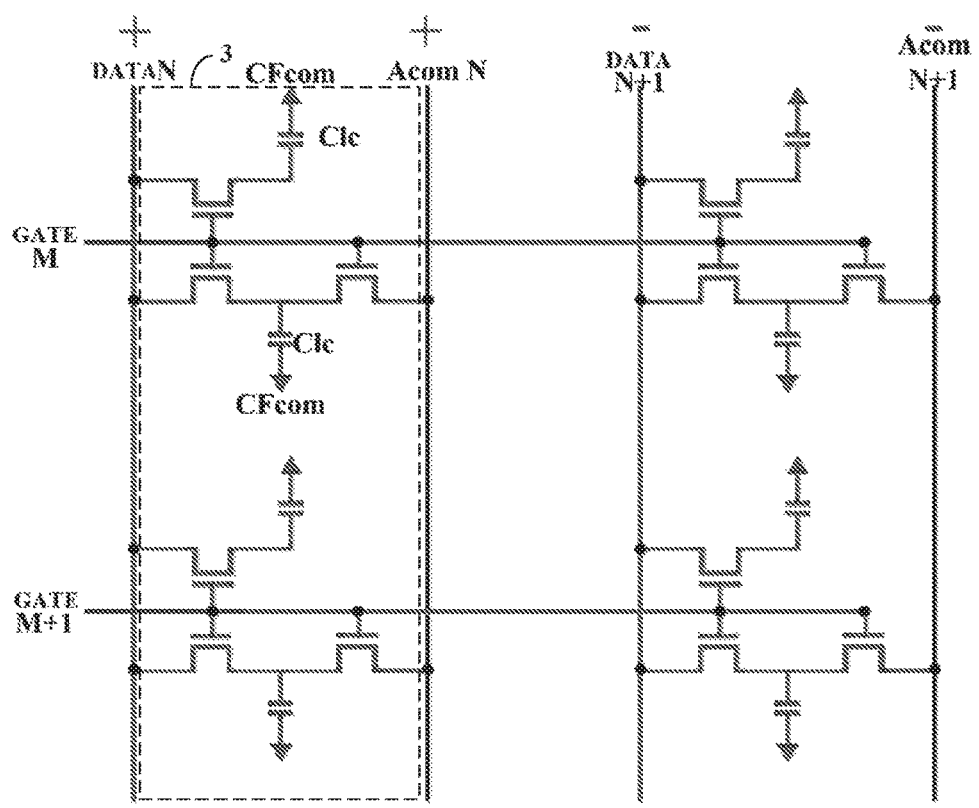
FIG. 2 schematically shows a pixel structure in a column inversion driving mode according to one embodiment of the present disclosure.
Figure 3:
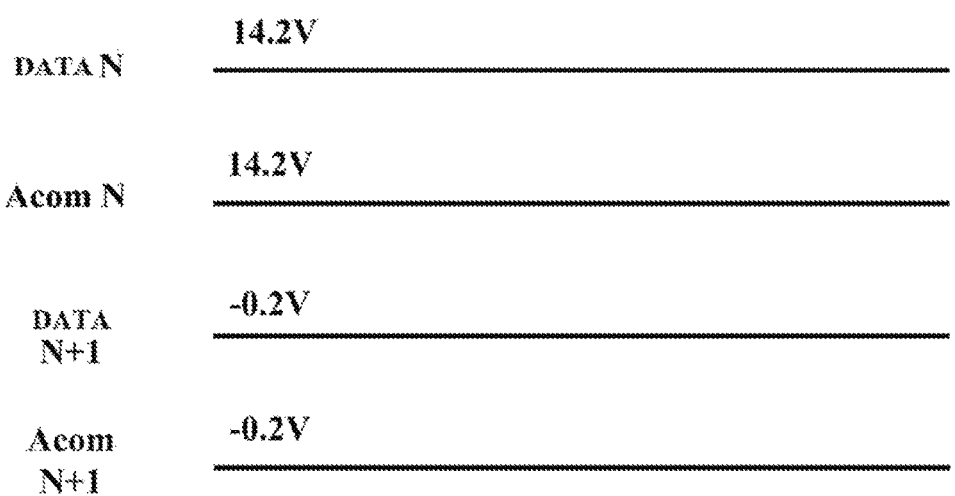
FIG. 3 shows a waveform of a driving voltage for driving the pixel structure as shown in FIG. 2 in one frame period.

FIG. 2 schematically shows the pixel structure in the column inversion driving mode according to the present embodiment. FIG. 3 shows a waveform of a driving voltage for driving the pixel structure as shown in FIG. 2 in one frame period. As shown in FIG. 2 and FIG. 3, horizontally arranged scanning lines are crisscrossed with vertically arranged data lines and stabilizing lines. The stabilizing lines and the data lines have a similar arrangement. There is no connection among the stabilizing lines. One column of stabilizing line corresponds to a pixel unit group 3 (as shown in a dotted box in FIG. 2), and is configured to provide one same stabilized signal to each pixel unit in the pixel unit group 3.

Each pixel unit comprises a main pixel unit 1 provided with a first TFT and a first pixel electrode, and a sub-pixel unit 2 provided with a second TFT, a third TFT (i.e., a sharing TFT) and a second pixel electrode. The first TFT, the second TFT and the third TFT constitute a 3T structure. Specifically, a gate of the first TFT, a gate of the second TFT and a gate of the third TFT are connected to one same scanning line and can be turned on by the scanning line synchronously. A source of the first TFT and a source of the second TFT are connected to one same data line. A drain of the first TFT is connected to the first pixel electrode of the main pixel unit 1, and a drain of the second TFT is connected to the second pixel electrode of the sub-pixel unit 2. Besides, the drain of the second TFT is further connected to a source of the third TFT, and a drain of the third TFT is connected to a corresponding stabilizing line.

When a medium-low grayscale image is displayed, an $N^{th}$ stabilizing line provides a stabilized signal Acom N to each pixel unit in an $N^{th}$ pixel unit group 3 surrounded by a dotted box in FIG. 2, and the stabilized signal Acom N differs from a data signal DATA N provided by an $N^{th}$ data line.

In this manner, when the medium-low image is displayed, the drain of the second TFT can be discharged through the third TFT to which the stabilized signal is introduced, and a Gamma curve is adjusted at the same time, so that a large viewing angle effect can be achieved. According to the present embodiment, the stabilizing line provides a 7V direct current (DC) signal and the data signal changes within a range from −0.2V to 14.2V. Through such arrangement, the drain of the second TFT can be discharged through the third TFT. In this manner, a main pixel voltage differs from a sub-pixel voltage, and thus a large viewing angle compensation function can be realized.

When a high grayscale image is displayed, the $N^{th}$ stabilizing line provides a stabilized signal Acom N to each pixel unit in the $N^{th}$ pixel unit group 3 surrounded by the dotted box in FIG. 2, and the stabilized signal Acom N is the same as a data signal DATA N provided by the $N^{th}$ data line.

In this manner, when the high grayscale image is displayed, the stabilized signal is the same as the corresponding data signal. The drain of the second TFT will not be discharged through the third TFT, and thus the sub-pixel voltage is the same as the main pixel voltage. Hence, according to the present embodiment, brightness of the high grayscale image of a panel can be improved, and meanwhile, light transmittance and picture contrast of the panel can be improved.

In a specific implementing process, as shown in FIG. 3, the data signal DATA N is positive, while a data signal DATA N+1 is negative. When the high grayscale image is displayed, a voltage of the data signal DATA N is 14.2V, while a voltage of the data signal DATA N+1 is −0.2V. Similarly, a voltage of the stabilized signal Acom N is 14.2V, while a voltage of a stabilized signal Acom N+1 is −0.2V. Hence, when the high grayscale image is displayed, the stabilized signal has a same electric potential as the corresponding data signal, and thus the third TFT does not have a discharge function.

In a specific implementing process, the electric potential of the stabilized signal Acom can be regulated according to different display images, so that the brightness can be improved when the high grayscale image is displayed. Therefore, light transmittance and picture contrast of the panel can be improved.

Embodiment 4

According to the present embodiment, the pixel structure is driven by a dot inversion driving mode. In the dot inversion driving mode, polarities of data signals corresponding to two adjacent pixels (including horizontally adjacent and vertically adjacent) are opposite, as shown in positive and negative signs in FIG. 4.

Figure 4:
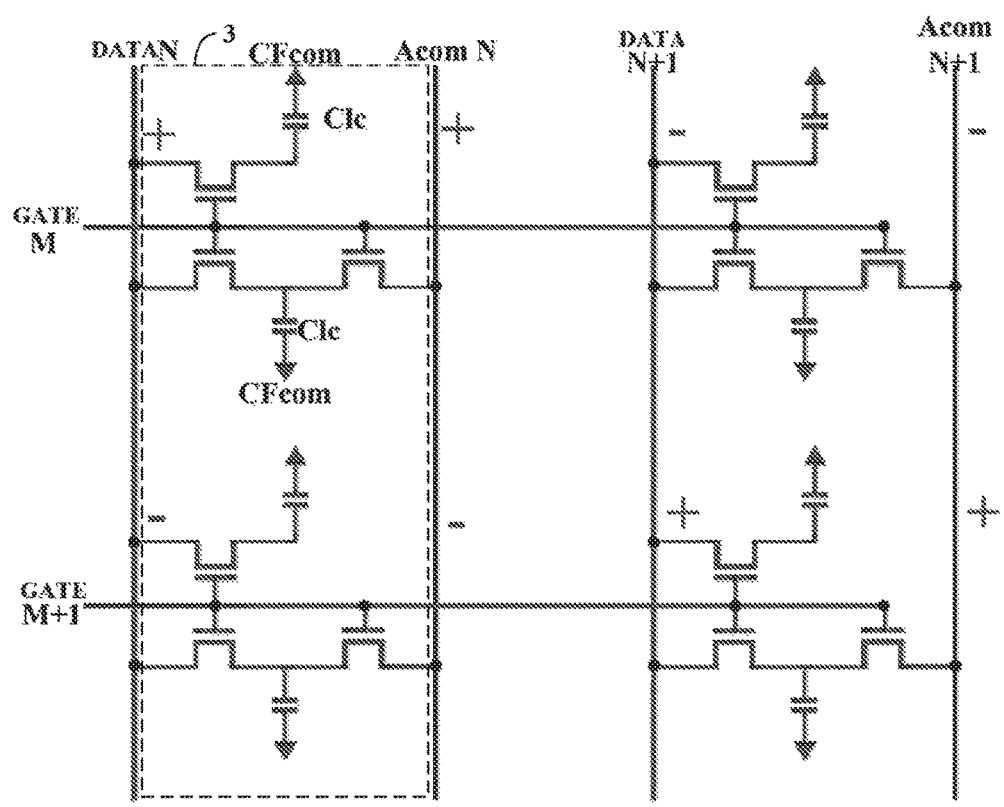
FIG. 4 schematically shows a pixel structure in a dot inversion driving mode according to one embodiment of the present disclosure.
Figure 5:
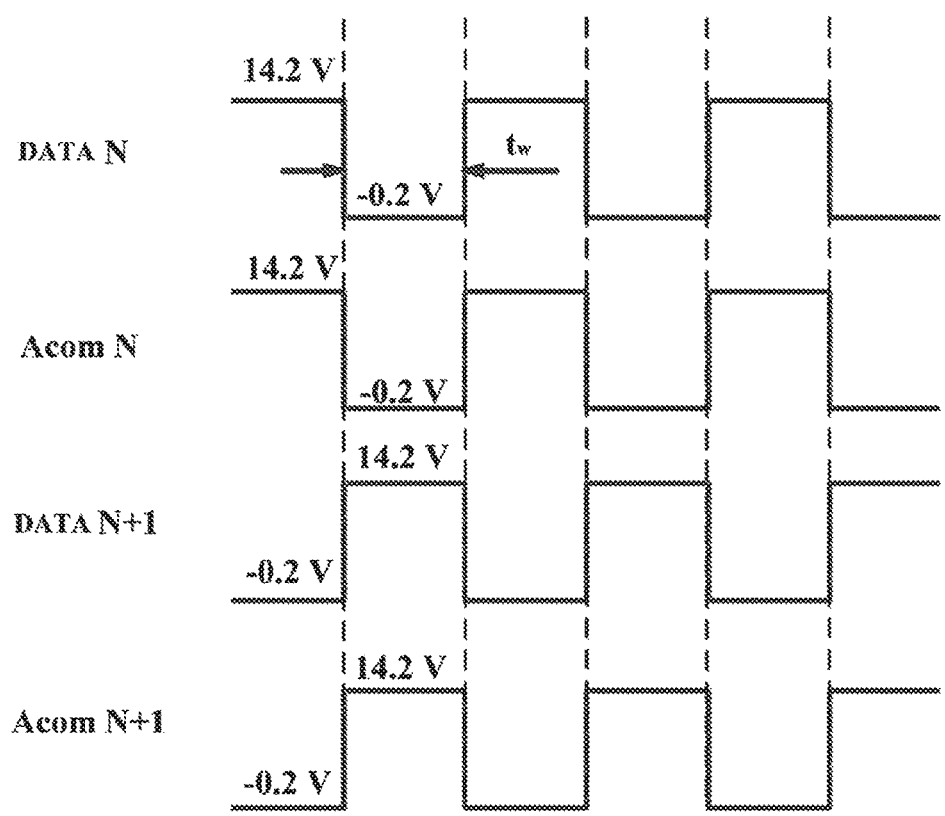
FIG. 5 shows a waveform of a driving voltage for driving the pixel structure as shown in FIG. 4 in one frame period.

FIG. 4 schematically shows the pixel structure in the dot inversion driving mode according to the present embodiment. FIG. 5 shows a waveform of driving voltage for driving the pixel structure as shown in FIG. 4 in one frame period. As shown in FIG. 4 and FIG. 5, horizontally arranged scanning lines are crisscrossed with vertically arranged data lines and stabilizing lines. The stabilizing lines and the data lines have a similar arrangement. There is no connection among the stabilizing lines. One column of stabilizing line corresponds to a pixel unit group 3 (as shown in a dotted box in FIG. 4), and is configured to provide one same stabilized signal to each pixel unit in the pixel unit group 3.

Each pixel unit comprises a main pixel unit 1 provided with a first TFT and a first pixel electrode, and a sub-pixel unit 2 provided with a second TFT, a third TFT (i.e., a sharing TFT) and a second pixel electrode. The first TFT, the second TFT and the third TFT constitute a 3T structure. Specifically, a gate of the first TFT, a gate of the second TFT and a gate of the third TFT are connected to one same scanning line and can be turned on by the scanning line synchronously. A source of the first TFT and a source of the second TFT are connected to one same data line. A drain of the first TFT is connected to the first pixel electrode of the main pixel unit 1, and a drain of the second TFT is connected to the second pixel electrode of the sub-pixel unit 2. Besides, the drain of the second TFT is further connected to a source of the third TFT, and a drain of the third TFT is connected to a corresponding stabilizing line.

When a medium-low grayscale image is displayed, an $N^{th}$ stabilizing line provides a stabilized signal Acom N to each pixel unit in an $N^{th}$ pixel unit group 3 surrounded by a dotted box in FIG. 4, and the stabilized signal Acom N differs from a data signal DATA N provided by an $N^{th}$ data line.

In this manner, when the medium-low image is displayed, the drain of the second TFT can be discharged through the third TFT to which the stabilized signal is introduced, and a Gamma curve is adjusted at the same time, so that a large viewing angle effect can be achieved. According to the present embodiment, the stabilizing line provides a 7V direct current (DC) signal and the data signal changes within a range from −0.2V to 14.2V. Through such arrangement, the drain of the second TFT can be discharged through the third TFT. In this manner, a main pixel voltage differs from a sub-pixel voltage, and thus a large viewing angle compensation function can be realized.

When a high grayscale image is displayed, the $N^{th}$ stabilizing line provides a stabilized signal Acom N to each pixel unit in the $N^{th}$ pixel unit group 3 surrounded by the dotted box in FIG. 4, and the stabilized signal Acom N is the same as a data signal DATA N provided by the $N^{th}$ data line.

In this manner, when the high grayscale image is displayed, the stabilized signal is the same as the corresponding data signal. The drain of the second TFT will not be discharged through the third TFT, and thus the sub-pixel voltage is the same as the main pixel voltage. Hence, according to the present embodiment, brightness of the high grayscale of a panel can be improved, and meanwhile, light transmittance and picture contrast of the panel can be improved.

In a specific implementing process, as shown in FIG. 5, the third TFT will not play a discharge function any more, so that the main pixel voltage is the same as the sub-pixel voltage, and an electric potential difference between the main pixel voltage (the sub-pixel voltage) and a signal CF com is maximum. Therefore, a deflection angle of liquid crystal is large. Meanwhile, a pixel region corresponding to the main pixel unit 1 and a pixel region corresponding to the sub-pixel unit 2 have same brightness. Hence, light transmittance and picture contrast of the panel can be improved.

Specifically, in the dot inversion driving mode, when the high grayscale image is displayed, polarities of signals provided by an $N^{th}$ data line and an adjacent $(N+1)^{th}$ data line are opposite, and polarities of data signals of pixels corresponding to an $M^{th}$ scanning line and an $(M+1)^{th}$ scanning line are also opposite. A switching time tw of the data signal is a charging time of one pixel. Of course, the switching time can be regulated according to actual charging condition of the panel. The stabilized signal and the corresponding data signal are synchronized and have an equal electric potential. That is, the stabilized signal Acom N is the same as the data signal DATA N, and a stabilized signal Acom N+1 is the same as a data signal DATA N+1. In this manner, when the high grayscale image is displayed, the drain of the second TFT will not be discharged through the third TFT. Therefore, light transmittance and picture contrast of the panel can be improved.

Embodiment 5

According to the present embodiment, the pixel structure is driven by a flip pixel driving mode. The flip pixel driving mode refers to a driving mode that an effect of a dot inversion driving mode is achieved by using a column inversion driving mode. In the flip pixel driving mode, polarities of data signals corresponding to two adjacent pixels (including horizontally adjacent and vertically adjacent) are opposite, as shown in positive and negative signs in FIG. 6.

Figure 6:
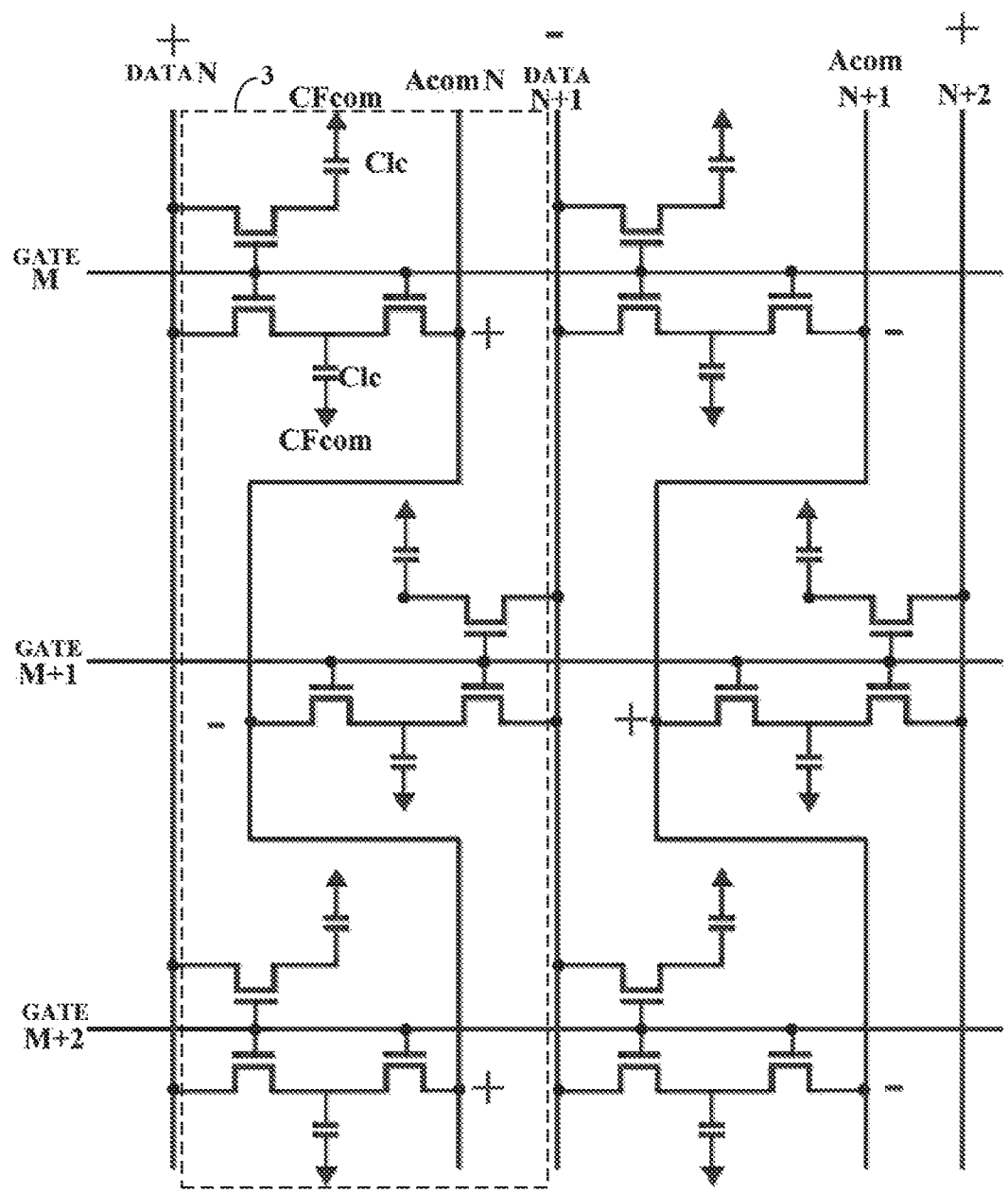
FIG. 6 schematically shows a pixel structure in a flip pixel driving mode according to one embodiment of the present disclosure.
Figure 7:
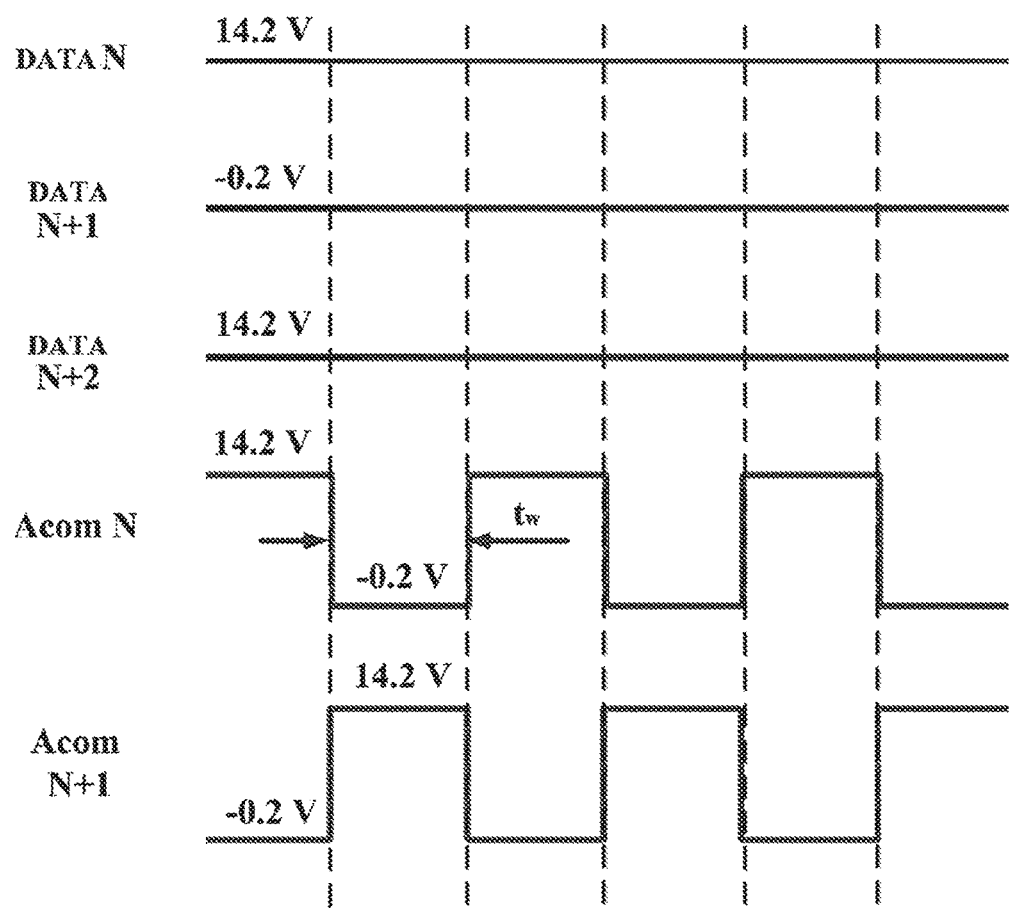
FIG. 7 shows a waveform of a driving voltage for driving the pixel structure as shown in FIG. 6 in one frame period.

FIG. 6 schematically shows the pixel structure in the flip pixel driving mode according to the present embodiment. FIG. 7 shows a waveform of a driving voltage for driving the pixel structure as shown in FIG. 6 in one frame period. As shown in FIG. 6 and FIG. 7, horizontally arranged scanning lines are crisscrossed with vertically arranged data lines and stabilizing lines. The stabilizing lines and the data lines have a similar arrangement. There is no connection among the stabilizing lines. One column of stabilizing line corresponds to a pixel unit group 3 (as shown in a dotted box in FIG. 6), and is configured to provide one same stabilized signal to each pixel unit in the pixel unit group 3.

Each pixel unit comprises a main pixel unit 1 provided with a first TFT and a first pixel electrode, and a sub-pixel unit 2 provided with a second TFT, a third TFT (i.e., a sharing TFT) and a second pixel electrode. The first TFT, the second TFT and the third TFT constitute a 3T structure. Specifically, a gate of the first TFT, a gate of the second TFT and a gate of the third TFT are connected to one same scanning line and can be turned on by the scanning line synchronously. A source of the first TFT and a source of the second TFT are connected to one same data line. A drain of the first TFT is connected to the first pixel electrode of the main pixel unit 1, and a drain of the second TFT is connected to the second pixel electrode of the sub-pixel unit 2. Besides, the drain of the second TFT is further connected to a source of the third TFT, and a drain of the third TFT is connected to a corresponding stabilizing line.

When a medium-low grayscale image is displayed, an $N^{th}$ stabilizing line provides a stabilized signal Acom N to each pixel unit in an $N^{th}$ pixel unit group 3 surrounded by a dotted box in FIG. 6, and the stabilized signal Acom N differs from a data signal DATA N provided by an $N^{th}$ data line.

In this manner, when the medium-low image is displayed, the drain of the second TFT can be discharged through the third TFT to which the stabilized signal is introduced, and a Gamma curve is adjusted at the same time, so that a large viewing angle effect can be achieved. According to the present embodiment, the stabilizing line provides a 7V direct current (DC) signal and the data signal changes within a range from −0.2V to 14.2V. Through such arrangement, the drain of the second TFT can be discharged through the third TFT. In this manner, a main pixel voltage differs from a sub-pixel voltage, and thus a large viewing angle compensation function can be realized.

When a high grayscale image is displayed, the $N^{th}$ stabilizing line provides a stabilized signal Acom N to each pixel unit in the $N^{th}$ pixel unit group 3 surrounded by the dotted box in FIG. 6, and the stabilized signal Acom N is the same as a data signal (DATA N or DATA N+1) received by a pixel unit in a turned-on state. As shown in FIG. 6 and FIG. 7, when an $M^{th}$ pixel unit in the dotted box is turned on, the stabilized signal Acom N is the same as the data signal DATA N. When an $(M+1)^{th}$ pixel unit in the dotted box is turned on, the stabilized signal Acom N is the same as the data signal DATA N+1.

In this manner, when the high grayscale image is displayed, the stabilized signal is the same as the data signal corresponding to the pixel unit in the turned-on state. The drain of the second TFT will not be discharged through the third TFT, so that the sub-pixel voltage is the same as the main pixel voltage. Hence, according to the present embodiment, brightness of the high grayscale image of a panel can be improved, and meanwhile, light transmittance and picture contrast of the panel can be improved.

In a specific implementing process, as shown in FIG. 7, the third TFT will not play a discharge function any more, so that the main pixel voltage is the same as the sub-pixel voltage, and an electric potential difference between the main pixel voltage (the sub-pixel voltage) and a signal CF com is maximum. Therefore, a deflection angle of liquid crystal is large. Meanwhile, a pixel region corresponding to the main pixel unit 1 and a pixel region corresponding to the sub-pixel unit 2 have same brightness. Hence, light transmittance and picture contrast of the panel can be improved.

Specifically, in the flip pixel driving mode, when the high grayscale image is displayed, polarities of signals provided by an $N^{th}$ data line and an adjacent $N+1^{th}$ data line are opposite, so that the effect of dot inversion driving mode is achieved by the flip pixel design. As shown in FIG. 7, the data signals corresponding to the pixel unit connected to the $N^{th}$ stabilizing line comprise the data signal DATA N and the data signal DATA N+1. Hence, the stabilized signal can be switched between the data signals DATA N and DATA N+1, and a switching time tw is a charging time of one pixel. Of course, the switching time can be regulated according to actual charging condition of the panel. Similarly, an electric potential of the stabilized signal Acom N+1 can be switched between the data signals DATA N+1 and DATA N+2. It can be seen that, polarities of the stabilized signals Acom N and Acom N+1 are opposite. In this manner, when the high grayscale image is displayed, the drain of the second TFT will not be discharged through the third TFT. Therefore, light transmittance and picture contrast of the panel can be improved.

Embodiment 6

The present embodiment provides an array substrate, which comprises a plurality of scanning lines and a plurality of data lines which are arranged crisscross, and the pixel structure according to any one of the aforesaid embodiments 1 to 5.

By applying the array substrate of the present embodiment, brightness of grayscale can be improved when a high grayscale image is displayed, so that light transmittance and picture contrast of the display panel can be improved. In addition, a large viewing angle compensation function of the display panel can be achieved when the medium-low grayscale image is displayed.

Embodiment 7

The present embodiment provides a display panel, which comprises an array substrate, a color filter substrate and a liquid crystal layer arranged between the array substrate and the color filter substrate. According to the present embodiment, the array substrate is the array substrate according to the above embodiment 6. The display panel according to the present embodiment can be applied to, for example, mobile phones, laptops, tablets and televisions.

By applying the display panel of the present embodiment, brightness of grayscale can be improved when a high grayscale image is displayed, so that light transmittance and picture contrast of the display panel can be improved. In addition, a large viewing angle compensation function of the display panel can be achieved when the medium-low grayscale image is displayed.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A display panel, comprising:
an array substrate;
a color filter substrate; and
a liquid crystal layer arranged between the array substrate and the color filter substrate, wherein the array substrate comprises:
  a plurality of scanning lines and a plurality of data lines which are arranged crisscross; and
  a pixel structure, which comprises a plurality of pixel unit groups, and each pixel unit group comprises a plurality of pixel units arranged in sequence along a data line direction, wherein each pixel unit comprises:
    a main pixel unit configured to receive a scanning signal from a scanning line, and receive a data signal from a data line so as to have a main pixel voltage; and
    a sub-pixel unit, configured to receive the scanning signal from the scanning line, and receive the data signal from the data line and a stabilized signal from a stabilizing line so as to have a sub-pixel voltage;
  wherein stabilizing lines correspond to the pixel unit groups one to one, and each stabilizing line is configured to provide the stabilized signal to each pixel unit in a corresponding pixel unit group; and
  wherein the stabilized signal provided by the stabilizing line is the same as a data signal received by a pixel unit in a turned-on state in the corresponding pixel unit group when a high grayscale image is displayed.

2. The display panel according to claim 1, wherein the stabilized signal provided by the stabilizing line differs from the data signal received by the pixel unit in the turned-on state in the corresponding pixel unit group when a medium-low grayscale image is displayed.

3. The display panel according to claim 1, wherein the stabilizing line is arranged in a same layer as a drain of a switching element of a sub-pixel unit in each pixel unit in a corresponding pixel unit group.

4. An array substrate, comprising:
a plurality of scanning lines and a plurality of data lines which are arranged crisscross; and
a pixel structure, which comprises a plurality of pixel unit groups, and each pixel unit group comprises a plurality of pixel units arranged in sequence along a data line direction, wherein each pixel unit comprises:
  a main pixel unit configured to receive a scanning signal from a scanning line, and receive a data signal from a data line so as to have a main pixel voltage; and
  a sub-pixel unit, configured to receive the scanning signal from the scanning line, and receive the data signal from the data line and a stabilized signal from a stabilizing line so as to have a sub-pixel voltage;
wherein stabilizing lines correspond to the pixel unit groups one to one, and each stabilizing line is configured to provide the stabilized signal to each pixel unit in a corresponding pixel unit group; and wherein the stabilized signal provided by the stabilizing line is the same as a data signal received by a pixel unit in a turned-on state in the corresponding pixel unit group when a high grayscale image is displayed.

5. The array substrate according to claim 4, wherein the stabilized signal provided by the stabilizing line differs from the data signal received by the pixel unit in the turned-on state in the corresponding pixel unit group when a medium-low grayscale image is displayed.

6. The array substrate according to claim 4, wherein the stabilizing line is arranged in a same layer as a drain of a switching element of a sub-pixel unit in each pixel unit in a corresponding pixel unit group.

7. A pixel structure, comprising a plurality of pixel unit groups, each pixel unit group comprising a plurality of pixel units arranged in sequence along a data line direction, wherein each pixel unit comprises:
    a main pixel unit, configured to receive a scanning signal from a scanning line, and receive a data signal from a data line so as to have a main pixel voltage; and
    a sub-pixel unit, configured to receive the scanning signal from the scanning line, and receive the data signal from the data line and a stabilized signal from a stabilizing line so as to have a sub-pixel voltage,
    wherein stabilizing lines correspond to the pixel unit groups one to one, and each stabilizing line is configured to provide the stabilized signal to each pixel unit in a corresponding pixel unit group; and
    wherein the stabilized signal provided by the stabilizing line is the same as a data signal received by a pixel unit in a turned-on state in the corresponding pixel unit group when a high grayscale image is displayed.

8. The pixel structure according to claim 7, wherein the pixel structure is driven by a column inversion driving mode.

9. The pixel structure according to claim 7, wherein the pixel structure is driven by a dot inversion driving mode.

10. The pixel structure according to claim 7, wherein the pixel structure is driven by a flip pixel driving mode.

11. The pixel structure according to claim 7, wherein the stabilized signal provided by the stabilizing line differs from the data signal received by the pixel unit in the turned-on state in the corresponding pixel unit group when a medium-low grayscale image is displayed.

12. The pixel structure according to claim 11, wherein the pixel structure is driven by a column inversion driving mode.

13. The pixel structure according to claim 11, wherein the pixel structure is driven by a dot inversion driving mode.

14. The pixel structure according to claim 11, wherein the pixel structure is driven by a flip pixel driving mode.

15. The pixel structure according to claim 11, wherein the stabilized signal provided by the stabilizing line is a direct-current (DC) signal when the medium-low grayscale image is displayed.

16. The pixel structure according to claim 7, wherein the stabilizing line is arranged in a same layer as a drain of a switching element of a sub-pixel unit in each pixel unit in a corresponding pixel unit group.

17. The pixel structure according to claim 16, wherein the pixel structure is driven by a column inversion driving mode.

18. The pixel structure according to claim 16, wherein the pixel structure is driven by a dot inversion driving mode.

19. The pixel structure according to claim 16, wherein the pixel structure is driven by a flip pixel driving mode.

20. The pixel structure according to claim 16, wherein the switching element is a thin film transistor.

* * * * *